United States Patent
Shimada et al.

(10) Patent No.: US 6,484,540 B1
(45) Date of Patent: Nov. 26, 2002

(54) METHOD FOR WELDING A QUARTZ GLASS TUBE FOR USE AS AN OPTICAL FIBER PREFORM

(75) Inventors: Atsuhi Shimada, Koriyama (JP); Toshiyuki Kato, Koriyama (JP); Masanori Suzuki, Koriyama (JP); Yutaka Watabe, Koriyama (JP)

(73) Assignees: Heraeus Quarzglas GmbH & Co. KG, Hanau (DE); Shin-Etsu Quartz Products Co., Ltd., Tokyo (JP)

( * ) Notice: Subject to any disclaimer, the term of this patent is extended or adjusted under 35 U.S.C. 154(b) by 0 days.

(21) Appl. No.: 09/581,734

(22) PCT Filed: Oct. 14, 1999

(86) PCT No.: PCT/EP99/07734

§ 371 (c)(1),
(2), (4) Date: Aug. 11, 2000

(87) PCT Pub. No.: WO00/23389

PCT Pub. Date: Apr. 27, 2000

(30) Foreign Application Priority Data

Oct. 16, 1998 (JP) .............................. 10-314114

(51) Int. Cl.⁷ ................................. C03B 37/15
(52) U.S. Cl. ..................... 65/407; 65/406; 65/36; 65/42; 65/412; 65/477; 65/DIG. 9
(58) Field of Search ................... 65/407, DIG. 9, 65/406, 36, 42, 412, 477

(56) References Cited

U.S. PATENT DOCUMENTS 4,881,007 A * 11/1989 Egelstam ..................... 65/407

FOREIGN PATENT DOCUMENTS

| DE | 0639258 | * 11/1936 | |
| EP | 0 182 250 | * 5/1986 | |
| GB | 2315267 | * 1/1998 | |
| JP | 58-187903 | * 11/1983 | ............... 65/407 |
| JP | 5-97453 | * 4/1993 | |
| JP | 109141/1995 | 4/1995 | |
| WO | WO 98/33746 | * 8/1998 | |

OTHER PUBLICATIONS

Abstract of JP58–187903, Nov. 1983.*
Patent Abstract of Japan–Pub.No. 05097453, Apr. 1993.*

* cited by examiner

Primary Examiner—James Derrington
(74) Attorney, Agent, or Firm—Milde & Hoffberg LLP

(57) ABSTRACT

A method for welding a dummy tube to a quartz glass tube for use as an optical fiber preform, comprising chamfering the inner edge portion of the dummy tube and/or the quartz glass tube for use as the optical fiber preform before welding the quartz glass tube for use as the optical fiber preform with the dummy tube, and then melt welding them together.

16 Claims, 1 Drawing Sheet

METHOD FOR WELDING A QUARTZ GLASS TUBE FOR USE AS AN OPTICAL FIBER PREFORM

INDUSTRIAL FIELD OF APPLICATION

The present invention relates to a welding method for welding a quartz glass tube for use as an optical fiber preform with a dummy tube; in further detail, it relates to a welding method for welding a large quartz glass tube for use as an optical fiber preform with a dummy tube.

PRIOR ART

Recently, a larger amount of optical fibers, particularly, the single mode optical fibers, are being used with increasing practical use of optical fibers. However, it is expected that a still larger amount of optical fibers will be necessary with the expansion in its field of usage ranging from long distance main communication lines to domestic lines. To meet with such a demand in the expansion of usage, it is indispensable to realize mass production and cost reduction in the production of optical fibers. This can be accomplished most simply by forming a large optical fiber preform and by then drawing it. In the conventional practical method for producing optical fibers such as the vapor-phase axial deposition process (VAD process) or the outer vapor-phase deposition process (OVD process), the core portion and the clad portion are all produced by VAD or OVD process. Thus, in case of scaling up, there was a disadvantage that the productivity of the fiber optical preform may be lowered. Furthermore, if it is tried to form a larger porous body before vitrification into a transparent body (that is, a soot body obtained by depositing fine silica glass particles, and is referred to hereinafter as ,a porous soot body), there may generate troubles such as the generation of cracks or the drop off of the porous soot body, resulting in great reduction of the productivity. As a method for producing an optical fiber which overcomes the above problems, in Japanese Patent Laid-Open No. 109141/1995 and the like is proposed a production method, i.e., the so-called rod-in-tube method, which comprises forming the quartz glass tube for use as the clad portion accounting for 80% or more of the cross section area by a method capable of producing a high performance quartz glass tube and yet of reducing cost, and then monolithically integrating the resulting quartz glass tube with the core glass rod formed by, for example, the VAD process or the OVD method.

In the production method described in the above Laid-Open Japanese patent application, in order to lower the production cost of the optical fiber, for instance, as shown in the Example described therein, a low cost dummy tube is welded in the front end of the expensive quartz glass tube for use in the optical fiber preform, and transportation, melt welding into a monolithic body, etc., are conducted by clamping the dummy tube. This welding method comprises heating and melting both tubes and then directly pressing the edges thereof against each other without using a welding rod, and, after welding, if necessary, the outer surface was shaped by pressing the outer circumferential surface by use of a graphite trowel and the like. In case of using such a welding method, the shortcomings were ignored even if the welding before pressing was insufficient, and hence, there was a danger of causing accidents such as the falling off of the welded portion.

Under such circumstances, it has been thought of sufficiently melting the welding edges of the quartz glass tube for use as the preform and the dummy tube, and then pressing against each other by a sufficiently strong force. However, in case where it was sufficiently melted and pressed against each other with a sufficiently strong force, there occurred deformation at the welded portion, such that the quartz glass tube for use as the preform and the dummy were mutually intruded into each other, or the edges were rounded, thereby leading to the contraction of the inner diameter while expanding the outer diameter. The expansion of the outer diameter is not problematic unless the degree is extreme, but when the contraction of the inner diameter occurs, the scheduled difference between the outer diameter of the core glass rod for use as the preform and the inner diameter of the quartz glass tube for the preform (that is, the clearance between the core glass rod and the quartz glass tube, which hereinafter is referred to as "clearance") causes difficulty in inserting the core glass rod for use as the preform, and forms flaws on the inner circumferential surface of the quartz glass tube for use as the preform. As a result, bubbles were included in the welded interface of the preforms for use as the optical fiber, or, at worst, it was sometimes impossible to insert the core glass rod for use of the preform, and this made the production of the preforms for use as the optical fiber unfeasible. It is thinkable to use a quartz glass tube for use as the preform having a sufficiently large inner diameter which matches with the clearance taking the contraction of the inner diameter into account However, taking such a large clearance makes it difficult to realize a uniform monolithic body upon melt welding together, thereby leading to disadvantages such as a large eccentricity of the preform for use as the optical fiber obtained as the product, or an increase in the probability of increasing the elliptical degree of the preform and/or the core.

Accordingly, the present inventors have extensively continued studies, and, as a result, found that a welding resulting in high welding strength and free from contraction in inner diameter can be realized by chamfering the inner edge portion of the dummy tube and/or the quartz glass tube for use as the optical fiber preform before welding the quartz glass tube for use as the preform with the dummy tube, and then heat melting them to join them together. The present invention has been accomplished based on these findings.

An object of the present invention is to provide a welding method which results in a high welding strength and which does not cause contraction of the inner diameter of the welded portion.

To accomplish the above object, the present invention relates to a welding method wherein a dummy tube is welded to a quartz glass tube for use as an optical fiber preform, characterized by comprising chamfering the inner edge portion of the dummy tube and/or the quartz glass tube for use as the optical fiber preform before welding said quartz glass tube for use as the preform with the dummy tube, and then heat melting them to melt welding them together.

The aforementioned quartz glass tube for use as the preform can be produced by a method comprising, for instance, forming a porous soot body (the porous soot body formed from fine particles of silica glass is hereinafter referred to as "a porous soot body") by depositing fine silica glass particles generated by flame hydrolysis of a high-purity silicon tetrachloride or a siloxane compound such as an organic silicon compound in an oxyhydrogen flame, and obtaining a quartz glass tube by subjecting to mechanical grinding, the quartz glass ingot obtained by vitrifying the thus obtained porous soot body into a transparent body, or the quartz glass ingot obtained by subjecting a quartz powder prepared by crushing a naturally occurring quartz to chemical treatment to obtain a purified quartz powder, and then subjecting the resulting powder to Verneuil's process using an oxyhydrogen flame. Because a quartz glass tube for use as the preform is expensive, it should be effectively used, and, in general, a dummy tube is connected in case of inserting the core glass rod for optical fiber preforms into the quartz glass tube for use as the preform and heating them together to obtain a melt welded monolithic body. As the dummy tube, used are the lower quality cheaper quartz glass tubes such as those containing a larger amount of impurities, bubbles, etc., as. compared with the above described quartz glass tube, and these dummy tubes are thinner in thickness and have an inner diameter equal to or larger than the quartz glass tube for use as the preform. The above described dummy tubes are provided to both ends of the quartz glass tube for use as the preform, and the supporting side of the dummy tube is called as the handling tube, end dummy, etc., whereas that on the opposite side thereof is called as the start dummy, etc. In the present invention, these tubes are collectively denoted as "dummy tubes". In joining the dummy tube with the quartz glass tube for use as the preform, no welding rod is used, and the edge portions of the dummy tube and/or the quartz glass tube for use as the preforms are heated and molten by using an oxygen/hydrogen burner, a propane/oxygen burner, or an electric furnace to melt weld them together. In the welding method according to the present invention, prior to the welding of the dummy tube and the quartz tube, the inner edge portion on the welding surface side of the dummy tube and/or the quartz glass tube for use as the optical fiber is chamfered, and then fused for melt welding. In this case, preferably, the quartz glass tube for use as the preform and the dummy tube are both chamfered. In particular, when the inner diameter of both tubes is equivalent to or close the inner diameter of the quartz glass tube for use as the preform, it is necessary to chamfer the inner edge portions of both tubes, as shown in FIG. 1, but in case the difference between the inner diameter of the tubes is large, chamfering of either one is sufficient. In this case, as is shown in FIG. 2, preferably, the inner edge portion of the tube having a smaller inner diameter is chamfered. More specifically, in case where the difference in inner diameter of the tubes is 20% or more of the wall thickness of the tube having the smaller inner diameter, it is preferred to chamfer the edge portion of only the tube having the smaller inner diameter, because the operation load attributed to processing and the like can be reduced. By thus chamfering, no contraction of inner diameter results even if there occurs an expansion attributed to the pressing applied during welding. Although depending on the inner diameter, the wall thickness, etc., of the quartz glass tube for use as the preform and the dummy tube, the amount to be chamfered is preferably 2 mm or more but not more than 30% of the wall thickness. If the chamfering should be performed at an amount less than the aforementioned range, there is no effect of chamfering but leads to the contraction of the inner diameter. If the amount of chamfering should exceed the range above, the wall thickness of the chamfered portion becomes too small as to lower the strength. For the chamfering of the edge portions of the glass tube and the like, a linear chamfering known as the so-called "C-type chamfering" is mostly employed; in the present invention, although a similar effect can be obtained by a non-linear chamfering known as the so-called "R-type chamfering", it is preferred to employ the C-type chamfering from the viewpoint of reducing the operational load such as processing.

Embodiments of the Invention

Preferred embodiments according to the present invention are described below by way of examples, but it should be understood that the present invention is by no means limited thereto.

Example 1

A quartz glass ingot was produced in accordance with OVD method by vaporizing a high-purity silicon tetrachloride, performing flame hydrolysis in an oxyhydrogen flame, spraying the resulting product on a rotating quartz glass rod to obtain a large porous soot material, and transparently vitrifying the resulting product at 1600° C. to obtain a quartz glass ingot. Both ends of the quartz glass ingot were cut, the outer circumferential plane was ground by using a cylindrical grinding machine, and the circular center of the outer diameter was obtained by measuring the dimension by use of a laser outer diameter measuring machine. Thus, a quartz glass tube was obtained by perforating the quartz glass ingot by use of a core drill perforating machine in accordance with the thus obtained circular center of the outer diameter. The quartz glass tube thus produced was subjected to an etching treatment with hydrofluoric acid, rinsing with pure water, and drying to obtain a quartz glass tube for use as the preform having an outer diameter of 180 mm and an inner diameter of 50 mm.

Figure 1:
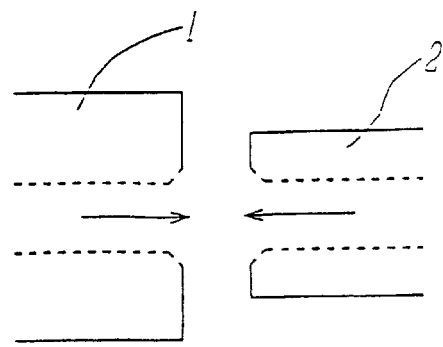
FIG. 1 is explanatory showing chamfering the edge portions of both the quartz glass tube for use as the preform 1 and the dummy tube 2, and then welding them together.
Figure 1:
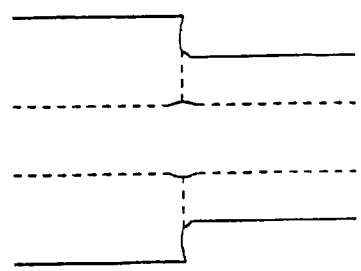

Separately, by using a quartz powder having a lower purity and electric fusion process, a dummy tube 120 mm in outer diameter and 50 mm in inner diameter was produced. The inner edge portions in the welding side of both tubes were subjected to C-type chamfering for a length of 10 mm in the circumferential direction and 10 mm in the longitudinal direction. Then, the edge portions on the welding side of the quartz glass tube for use as the preform and the dummy tube were molten by heating for of 20 minutes while maintaining the predetermined calorific value, positional relation, etc., and the edge planes were pressed against each other as indicated by arrows in FIG. 1. The inner diameter of the thus obtained welded portion of the quartz glass tube for use as the preform and the dummy tube was 50 mm, which was found to maintain the original inner diameter. On performing static load tensile strength test, it was found that no breakage occurred on the welded portion even when the maximum testing load of 3 tons was applied thereto.

Then, by taking the clearance for inserting into the above described quartz glass tube into account, a core glass rod 46 mm in outer diameter was inserted into the quartz glass tube carefully so that it may not be brought into contact with the inner circumferential plane of the quartz glass tube, and an internal pressure of the tube was reduced by using a vacuum pump after melt welding the edge portions. Then, a preform for use as an optical fiber was produced by heating the resulting product in an electric furnace to obtain a monolithic body by melt welding. On producing a single mode optical fiber 125 μm in outer diameter by wire drawing the preform for use as the optical fiber, an optical fiber having an eccentricity of 0.2 μm was obtained.

Comparative Example 1

The quartz glass tube for use as the preform and the dummy tube prepared in Example 1 were molten by using a propane/oxygen burner and welded in the same manner as in Example 1, except for not applying chamfering. The inner diameter of the smallest portion in the welded portion was found to be 42 mm. For the strength test of the welded portion, static tensile strength test was performed to find that no breakage occured on the welded portion even when the maximum testing load of 3 tons was applied thereto.

Then, by taking the clearance for inserting into the above described quartz glass tube into account, a core glass rod 38 mm in outer diameter was used, and a preform for use as an optical fiber was produced in the same manner as in Example 1 by melt welding them together to obtain a monolithic body. On producing a single mode optical fiber 125 μm in outer diameter by wire drawing the preform, the optical fiber was found to have an eccentricity of 1.3 μm, and was found impossible to comply with the general standard of 1 μm or less.

Comparative Example 2

Welding was performed in the same manner as in Example 1, except for changing only the duration of burner heating to 10 minutes. The inner diameter of the smallest portion in the welded portion was 50 mm, but since the welded portion underwent breakage at an applied load of 145 kg in performing static load tensile strength test, it was found that the produce was not in a welded state feasible for an operation while safely supporting the large quartz glass tube.

Example 2

Figure 2:
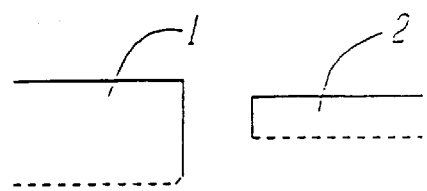
FIG. 2 is explanatory showing chamfering the edge portion of the quartz glass tube for use as the preform 1 only (and not of the dummy tube 2), and then welding them together.
Figure 2:
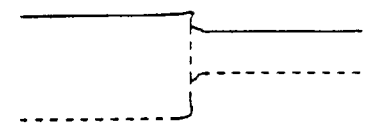
Figure 2:

A large porous soot body was produced in accordance with VAD method by vaporizing a high-purity silicon tetrachloride, performing flame hydrolysis in an oxyhydrogen flame, and depositing fine silica glass particles on a rotating quartz glass rod. The porous soot body thus obtained was vitrified at 1600° C. to obtain a transparent cylindrical quartz glass ingot. Both ends of the quartz glass ingot were cut, the outer circumferential plane was ground by using a cylindrical grinding machine, and the circular center of the outer diameter was obtained by measuring the dimension by use of a laser outer diameter measuring machine. The quartz glass ingot was perforated by use of a core drill perforating machine in accordance with the circular center to produce, a quartz glass tube for use as the preform having an outer diameter of 200 mm and an inner diameter of 50 mm. Then, as shown in FIG. 2, the edge portion of the inner diameter on the welding plane side of the quartz glass tube for use as the preform was subjected to C-type chamfering for a length of 5 mm in the circumferential direction and 5 mm in the longitudinal direction. Separately, in the same manner as in Example 1, a dummy tube 175 mm in outer diameter and 115 mm in inner diameter was produced, and was welded with the quartz glass tube for use as the preform by pressing them against each other as is indicated by arrows in FIG. 2. The inner diameter of the welded portion was found to be 50 mm, which was found to maintain the original size of the inner diameter. On performing static load tensile strength test, it was found that no breakage occurred on the welded portion even when the maximum testing load of 3 tons was applied thereto.

Comparative Example 3

Welding was performed in the same manner as in Example 2, except for not applying chamfering thereto. The inner diameter of the welded portion was reduced to 46 mm, and it was found impossible to insert a core glass rod 46 mm in outer diameter.

Effect of the Invention

The welding method according to the present invention is a welding method which provides an excellent welding strength and which does not cause shrinking of the inner diameter at the welded portion. Even when this welding method is used in the process of a so-called rod-in-tube method to weld a large quartz glass for use as the preform several tens of kilograms in weight to a dummy tube and to insert a core glass rod for use as the preform is inserted into the resulting welded tube and weld them, a large preform for use as an optical fiber can be produced without causing breakage and the like at the welded portion. Thus, the method is highly valuable in the industry.

What is claimed is:

1. A welding method wherein a dummy tube having an edge plane is welded to a quartz glass tube having an edge plane for use as an optical fiber preform, which comprises chamfering the inner edge portion of the dummy tube and/or the quartz glass tube for use as the optical fiber preform before welding said quartz glass tube for use as the preform with the dummy tube, and then melt welding the respective edge planes of the dummy tube and the quartz glass tube together.

2. A welding method as claimed in claim 1, wherein the quartz glass tube for use as the optical fiber preform is a large tube of synthetic quartz glass or a tube of naturally occurring quartz glass.

3. A welding method as claimed in claim 1, wherein the chamfering area accounts for at least 2 mm but not more than 30% of the wall thickness of at least a 2-mm tube.

4. A welding method as claimed in claim 2, wherein the chamfering area accounts for at least 2 mm but not more than 30% of the wall thickness of at least a 2-mm tube.

5. A welding method as claimed in claim 1, wherein both the quartz glass tube and the dummy tube are chamfered.

6. A welding method as claimed in claim 1, wherein the chamfer is formed by a linear chamfering-process.

7. A welding method as claimed in claim 1, wherein the chamfer is formed by a non-linear chamfering-process.

8. A welding method as claimed in claim 1, further comprising the steps of joining a core rod with the welded preform tube, and drawing the resulting rod-in-tube into an optical fiber.

9. A welding method wherein a dummy tube having an outer edge portion is welded to a quartz glass tube having an outer edge portion for use as an optical fiber preform, which comprises chamfering the inner edge portion of the dummy tube and/or the quartz glass tube for use as the optical fiber preform before welding said quartz glass tube for use as the preform with the dummy tube, and then melt welding outer edge portions of the dummy tube and quartz glass tube together by heating and mutual pressure, wherein a said chamfer provides a relief to prevent a narrowing of an internal diameter of the optical fiber perform proximate to the junction.

10. A welding method as claimed in claim 9, wherein the chamfering area accounts for at least 2 mm but not more than 30% of the wall thickness of at least a 2-mm tube.

11. A welding method as claimed in claim 9, wherein the quartz glass tube for use as the optical fiber preform is a large tube of synthetic quartz glass or a tube of naturally occurring quartz glass.

12. A welding method as claimed in claim 11, wherein the chamfering area accounts for at least 2 mm but not more than 30% of the wall thickness of at least a 2-mm tube.

13. A welding method as claimed in claim 9, wherein both the quartz glass tube and the dummy tube are chamfered.

14. A welding method as claimed in claim 9, wherein the chamfer is formed by a linear chamfering-process.

15. A welding method as claimed in claim 9, wherein the chamfer is formed by a non-linear chamfering-process.

16. A welding method as claimed in claim 9, further comprising the steps of joining a core rod with the welded preform tube, and drawing the resulting rod-in-tube into an optical fiber.

* * * * *